US005886712A

United States Patent [19]
Cheng

[11] Patent Number: 5,886,712
[45] Date of Patent: Mar. 23, 1999

[54] DATA CHANNEL EXTRACTION IN A MICROPROCESSOR

[75] Inventor: Xuejian Cheng, Sunnyvale, Calif.

[73] Assignee: Sun Microsystems, Inc., Palo Alto, Calif.

[21] Appl. No.: 862,446

[22] Filed: May 23, 1997

[51] Int. Cl.[6] .................................................. G06F 13/00
[52] U.S. Cl. ........................................... 345/523; 345/513
[58] Field of Search ..................................... 345/523, 524, 345/439, 525, 513; 382/276, 233; 364/725.03

[56] References Cited

U.S. PATENT DOCUMENTS

| | | | |
|---|---|---|---|
| 5,734,874 | 3/1998 | Van Hook et al. | 345/513 |
| 5,745,123 | 4/1998 | Rice | 345/439 |
| 5,802,219 | 9/1998 | Farkas et al. | 382/276 |

Primary Examiner—Kee M. Tung
Assistant Examiner—Sy Danh Luu
Attorney, Agent, or Firm—Fish & Richardson P.C.

[57] ABSTRACT

A method for operating a microprocessor in extracting an arbitrary channel of data from an image of any number of multiple channels with substantially minimized processing cycles per byte. Each channel of an image is preferably sampled with a predetermined data length. Subsequently the microprocessor partitions each of said sampled data according to a partitioning criterion into a plurality of partitioned components and combines a plurality of said partitioned components to form a data variable that is formed only with data components indicative of a selected channel of the image.

13 Claims, 4 Drawing Sheets

DATA CHANNEL EXTRACTION IN A MICROPROCESSOR

FIELD OF THE INVENTION

The invention relates to data channel extraction in a microprocessor.

BACKGROUND OF THE INVENTION

Color image data in a computer includes many components. Each pixel of an image is generally described by components for the color of the pixel (e.g., red, green, and blue), intensity and other information including relative position with respect to other pixels in the image. Each pixel is therefore represented by multiple pieces of information. These multiple pieces of information are often stored in a pixel-interleaved format, data bits of components of each pixel being arranged relative to one another to form a pixel data cluster. All pixel data clusters of the image are arranged relative to one another in a sequence. For example, data for a color image can be in the form of R1G1B1R2G2B2 ..., where R, G, and B often represent the data channels of red, green, and blue color intensity, respectively, and indexes 1 and 2 indicate pixels 1 and 2. In general, the data for each channel can also include digital information other than color information. For example, the α-channel includes the information for image compositing.

Even though the data is usually stored in this pixel interleaved format, data about one channel (or band) of an image is sometimes used alone for processing or printing. For example, the data about the red component of an image may need to be separated from other data of the image and be processed to achieve a desired result such as color touch-up. It may be also desirable to separate data of all the channels from a pixel-interleaved format so that each channel can be independently processed.

Channel extraction is sometimes done using software. For example, the red (R) channel may be extracted from a 3-channel (RGB) 8-bit type image in the following way as expressed in the C programing language:

```
void
ImageChannelExtractRed_U8_1()
{
unsigned char    *sp;      /* pointer to input data */
unsigned char    *dp;      /* pointer to output data */
unsigned char    dd;       /* 8-bit image data */
int              dsize;    /* image data size in pixels */
int    i;
for(i = 0; i < dsize;i++){
    dd = *sp;              /* read an 8-bit data */
    *dp = dd;              /* write an 8-bit data */
    sp = sp + 3;           /* sp points to next red element */
    dp = dp + 1;           /* sp points to next red element */
    }
}
```

Extraction of each byte of the red data requires two instructions: one load instruction (read) and one store instruction (write). Instructions for pointer increment may also be needed but can be grouped with (executed simultaneously with) load or store instructions. Thus, channel bytes can be extracted at a rate of 2 execution cycles per byte.

Another prior-art method of channel extraction uses data aligning instructions in the Visual Instruction Set (VIS) for UltraSPARC systems from Sun Microsystems. VIS is a comprehensive set of single-cycle instructions for processing audio, video, and imaging information in UltraSPARC microprocessors. A description of VIS can be found in, for example, "VIS User's Manual", release 1.0, Sun Microsystems, April, 1996, which is incorporated by reference. One example of this method with VIS is extracting the red (R) channel from a 3-channel (RGB) 8-bit type image by the following process in the C language:

```
void
ImageChannelExtractRed_U8_2()
{
unsigned char    *sp;      /* pointer to input data */
vis_d64 *dp;               /* pointer to output data */
vis_d64 sd;                /* 64-bit intermediate value */
vis_d64 dd;                /* 64-bit output data */
int              dsize;    /* image data size in pixels */
int    i;
vis_alignaddr((void *)0, 7);
for(i = 0; i < dsize / 8; i++) {
    sd = vis_ld_u8_i(sp, 21);
    dd = vis_faligndata(sd, dd);
    sd = vis_ld_u8_i(sp, 18);
    dd = vis_faligndata(sd, dd);
    sd = vis_ld_u8_i(sp, 15);
    dd = vis_faligndata(sd, dd);
    sd = vis_ld_u8_i(sp, 12);
    dd = vis_faligndata(sd, dd);
    sd = vis_ld_u8_i(sp, 9);
    dd = vis_faligndata(sd, dd);
    sd = vis_ld_u8_i(sp, 6);
    dd = vis_faligndata(sd, dd);
    sd = vis_ld_u8_i(sp, 3);
    dd = vis_faligndata(sd, dd);
    sd = vis_ld_u8_i(sp, 0);
    dd = vis_faligndata(sd, dd);
    sp += 24;
    *dp++ = dd;
    }
}
```

This allows eight 8-bit red elements to be extracted in an iteration.

However, the above channel extraction includes at least eight load instructions (i.e., vis_ld_u8_i) and one store instruction. Eight VIS instruction FALIGNDATAs are used for shifting the 8-byte data into a 64-bit register. These can be grouped with load or store instructions. Therefore, the best performance for this technique is 1.125 cycles/byte (8 cycles load and 1 cycle store per 8 bytes).

SUMMARY OF THE INVENTION

The inventor recognized the desirability of minimizing the number of CPU processing cycles per byte and devised a method and a microprocessor for extracting one or more arbitrary channels from an image of any number of multiple channels with improved efficiency.

One preferred embodiment of channel extraction with a microprocessor for an ensemble of data that interleaves data components having information of a plurality of channels comprises the steps of: sampling the ensemble of data to obtain a plurality of sampled data with a predetermined data length where the number of the sampled data is equal to a number of the channels; partitioning each of the sampled data according to a partitioning criterion for extracting the selected channel into partitioned components; combining a plurality of the partitioned components to form intermediate data variables having the predetermined data length where the intermediate data variables are formed in a way to facilitate the extraction of the selected channel; and repeating the partitioning with both the sampled data and the intermediate data variables until a data variable is formed only with data components of the ensemble of data that are indicative of the selected channel.

In extracting multiple channels according to one aspect of the invention, each channel that is to be extracted may be extracted from an ensemble of channel-interleaved data independently with respect to one another in a sequential manner. Alternatively, all the channels to be extracted may be extracted simultaneously to further improve the efficiency.

One advantage of the present invention includes the capability of simultaneously extracting data components of a channel from an interleaved format for a plurality of pixels rather than one pixel at a time. This at least in part contributes to the high efficiency and speed of the channel extraction based on the present invention. The processing efficiency and speed are critical to the performance of a microprocessor, particularly in applications requiring real-time processing such as multimedia and video conferencing, etc.

BRIEF DESCRIPTION OF THE DRAWINGS

These and other features and advantages will become more apparent in light of the following detailed description of preferred embodiment, as illustrated in the accompanying drawing, in which.

DESCRIPTION OF THE PREFERRED EMBODIMENT

A preferred embodiment is described herein with reference to a use of a special instruction of the Visual Instruction Set for UltraSPARC microprocessors: the vis_fpmerge instruction. This should be understood as an illustration of the concepts described herein and should not be construed as a limitation thereof. The techniques described herein can be practiced with other instructions in other microprocessors.

In addition, "image" is used to indicate not only the digital representation of an image. Any information, that is organized in a similar way having attributes of a digital image, could be processed in accordance with the present invention.

The examples described next use a special operation which the inventor has called "vis_fpmerge" in the VIS. The vis_fpmerge instruction operates to merge two 8-bit partitioned 32-bit arguments by selecting bytes from each in an alternating fashion.

Figure 1:
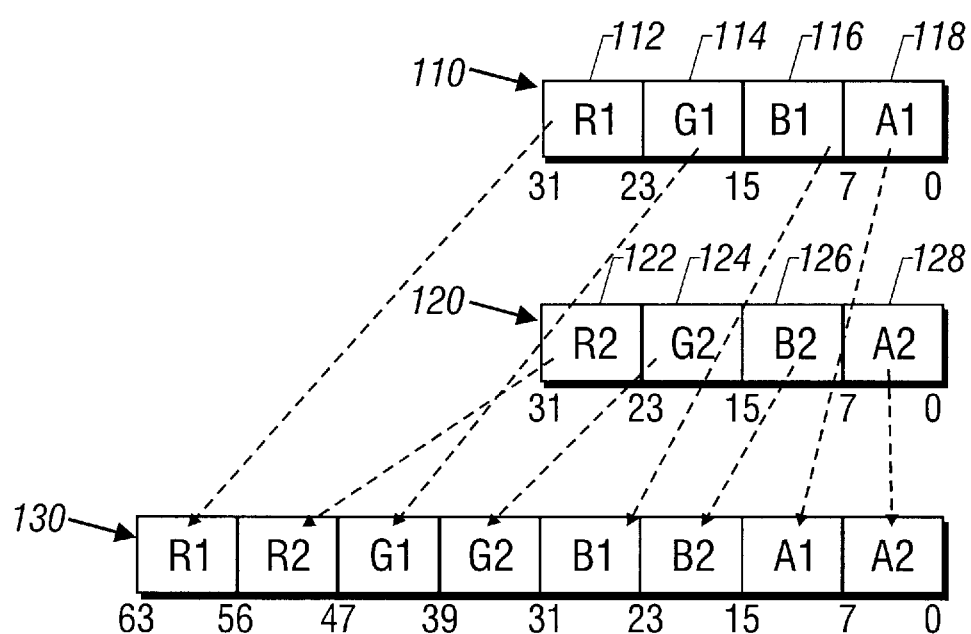
FIG. 1 is a schematic showing the operation of the vis_fpmerge instruction of the Visual Instruction Set for UltraSPARC microprocessors.

FIG. 1 illustrates the vis_fpmerge instruction. A 32-bit value 110 from a first pixel in a 32-bit register is partitioned into four channel units each having 8 bits of data that represents information from one channel. For example, a most significant byte (a channel unit) 112 has information of the red channel (R1) for the first pixel and a least significant byte 118 has information of the α-channel (A1) for the first pixel. Similarly, a 32-bit value 120 from a second pixel in another 32-bit register is partitioned into basic channel units 122 (R2), 124 (G2), 126 (B2), and 128 (A2). The vis_fpmerge instruction interleaves four corresponding 8-bit unsigned values within the first pixel and the second pixel to produce a 64-bit merged result 130 in a 64-bit register. This operation can be expressed as:

fpmerge R1G1B1A1 R2G2B2A2→R1R2G1G2B1B2 A1A2.

Figure 2:
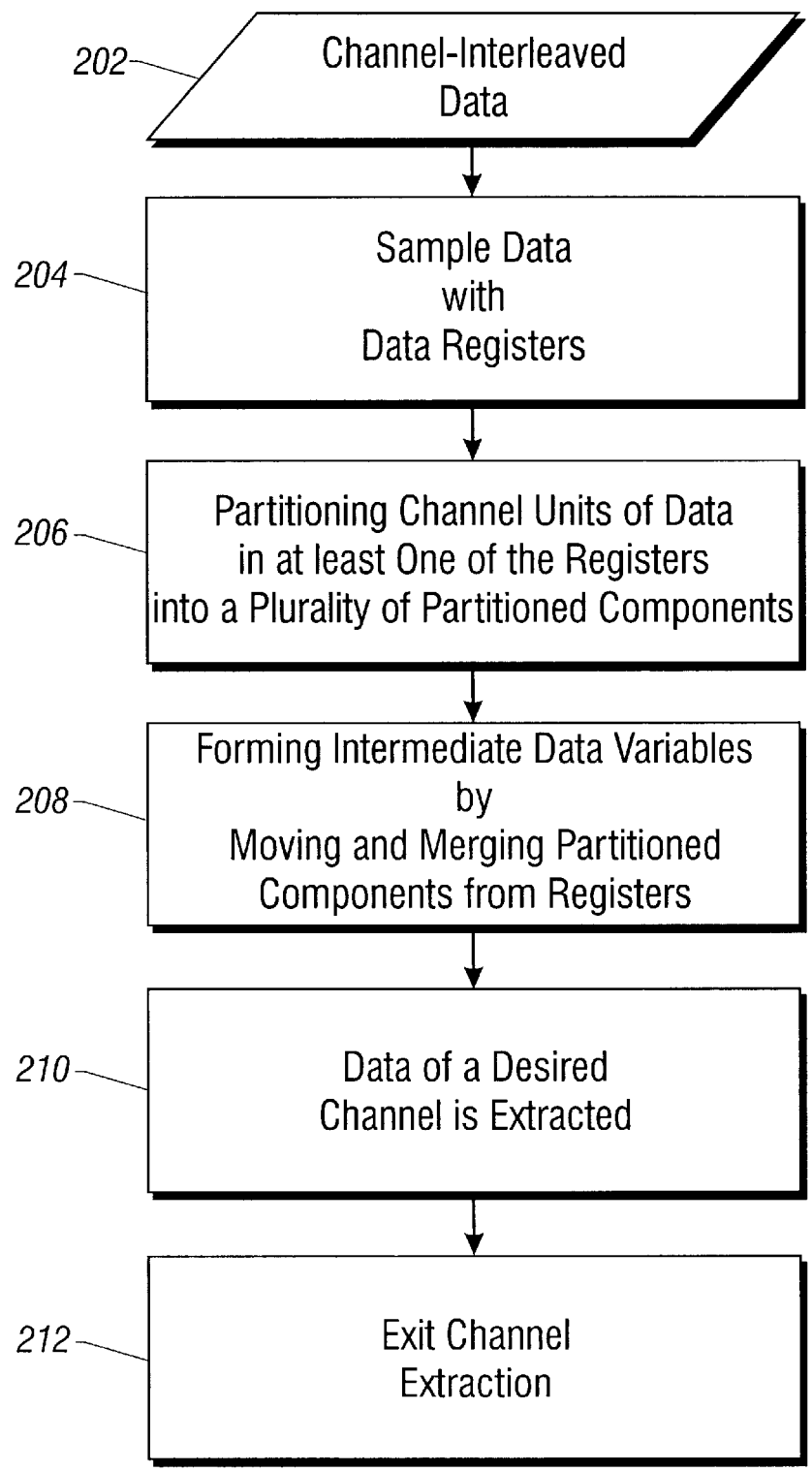
FIG. 2 is a flowchart of a preferred operation of channel extraction in accordance with the present invention.

Channel extraction according to our example includes data sampling, data partitioning, formation of intermediate data variables by moving and merging partitioned data components for a desired channel extraction, and delivering output. As seen in the flowchart of FIG. 2, an input data 202 is preferably channel-interleaved with each basic data unit having data bits of a single channel from a pixel in a digital image. The number of data bits in one basic data unit is called the "data type of the image". For example, an 8-bit data type means that the basic data unit for each channel has 8 bits of data. A multi-channel image may have, for example, an 8-bit or 16-bit data type for a microprocessor, and for other microprocessors, other data type could be used.

In the 8-bit data type example, data sampling is preferably carried out by sampling multiple 8-byte data from memory into several 64-bit data registers, where the number of 8-byte data sampled is preferably equal to the number of channels in the image. Hence, two 8-byte data are sampled for a 2-channel image and three 8-byte data are sampled for a 3-channel image. This sampling is indicated by step 204 of FIG. 2. This sampling effectively transforms the channel extraction into how to extract 8-byte data from multiple 8-byte source data stored in data registers.

Next in step 206, channel units of data in one or more data registers are partitioned into components with each component having multiple channel units. For example, the data in a 64-bit register can be partitioned into two 32-bit components, a most-significant-word part and a least-significant-word part, with each partition having four channel units (8-bit data type).

Subsequent to step 206, intermediate data variables are formed by moving and merging partitioned components (step 208). Each intermediate data variable preferably has a data length equal to the length of the sampled data in step 204. For example, two 32-bit partitioned components from one or two 64-bit registers can be selected to merge into an intermediate 64-bit data variable which is temporarily stored in a 64-bit register. If the data of a desired channel is extracted in this intermediate data variable, i.e., the intermediate data variable only has the data bits from the desired channel, the microprocessor completes the data extraction (step 212). Otherwise, the microprocessor repeats the steps 206 and 208 with all originally-sampled data in step 204 and generated intermediate data variables in previous cycles of performing the steps 206 and 208. This process continues until the data of a desired channel is extracted. The final extracted result is exported to memory for further processing.

The criterion for the partitioning, moving and merging data components in the steps 206 and 208 is to minimize the number of operations in extracting one or more desired channels. This criterion can vary dependent on the interleaved data structure of an image that is to be processed. An optimized sequence of partitioning, moving and merging data components is pre-determined based on the data structure (e.g., data type and number of channels) and which channel or channels are to be extracted. A control program for executing this optimized sequence is then used to control the microprocessor.

Three examples of extracting a channel from a multi-channel image by using the vis_fpmerge instruction of VIS are explained below to further illustrate the implementation of the preferred embodiment. In the examples, the vis_fpmerge instruction is to find the desired pairs of two 32-bit components to form a desired 64-bit intermediate data variable by the data merging.

A first example shows how to extract the R-channel from a 3-channel 8-bit image (in form of R0G0B0R1G1B1 . . . ).

The microprocessor first samples the 3-channel image by sequentially reading three 8-byte data into three 64-bit registers sd0, sd1, and sd2:

```
sd0: R0 -- -- R1 -- -- R2 --
sd1: -- R3 -- -- R4 -- -- R5
sd2: -- -- R6 -- -- R7 -- --
``` wherein Ri (i=0, 1, 2, . . . ) represents an 8-bit data for the R-channel and "--" represents an 8-bit data for other channels that are not relevant to the present operation. The microprocessor operates over three cycles to perform the above sampling, one cycle per register.

Next, the microprocessor moves the most significant four bytes of the register sd0 to form a new 32-bit data hi(sd0) and moves the least significant four bytes of the register sd1 to form another new 32-bit data lo(sd1), respectively:

```
hi(sd0): R0 -- -- R1
lo(sd1): R4 -- -- R5
```

In the above operation, two VIS instructions are used: hi () representing vis_read_hi() which reads the upper 32-bit components of a 64-bit data and lo () representing vis_read_lo () which reads the lower 32-bit components of a 64-bit data.

The microprocessor performs the vis_fpmerge on data hi(sd0) and lo(sd1) to form a new 64-bit intermediate data variable in register sda:

```
sda: R0 R4 -- -- -- -- R1 R5  vis_fpmerge (hi(sd0),lo(sd1))
```

The microprocessor subsequently performs a series of similar moving and merging operations on selected pairs of two 32-bit data to form a series of intermediate data variables, thereby extracting the desired R-channel. This is shown in the following:

```
sdb: -- -- -- -- R2 R6 -- -- vis_fpmerge (lo(sd0),hi(sd2))
sdc: -- -- R3 R7 -- -- -- -- vis_fpmerge (hi(sd1),lo(sd2))
sdd: R0 R2 R4 R6 -- -- -- -- vis_fpmerge (hi(sda),lo(sdb))
sde: -- -- -- -- R1 R3 R5 R7 vis_fpmerge (lo(sda),hi(sdc))
and
dd: R0 R1 R2 R3 R4 R5 R6 R7  vis_fpmerge (hi(sdd),lo(sde))
```

The last 64-bit data dd is the desired data with the data bits only from the R-channel.

In some microprocessors, such as UltraSPARC systems, it usually takes one operation cycle for reading a 64-bit data from system memory to a register or writing a 64-bit data from a register to system memory. In addition, UltraSPARC processors have some 64-bit floating-point registers that can be accessed as two separate 32-bit registers. In systems that operate in this way, the above moving operations of hi() and lo() usually do not actually take place, i.e. vis_fpmerge (hi(sd0), hi(sd1)) can be done in a single cycle.

The microprocessor operates for a total of six cycles in the above extraction. Specifically, three load and one store instructions are used in each iteration. Six vis_fpmerge instructions are used but they can be grouped with load or store instructions. The add instructions for pointer increment may also be grouped with vis_fpmerge, load or store instructions. So the best performance for this method is 0.75 cycles/byte (i.e., 6 cycles for vis_fpmerge/8 bytes).

The execution of the above example using the preferred embodiment can be carried out with the following process in form of a program in the C programming language:

```
void
ImageChannelExtractRed_U8_3()
{
    vis_d64 *sp;              /* pointer to input data */
    vis_d64 *dp;              /* pointer to output data */
    vis_d64 sd0, sd1, sd2;    /* 64-bit input data */
    vis_d64 sda, sdb, sdc;    /* 64-bit intermediate values */
    vis_d64 sdd, sde;         /* 64-bit intermediate values */
    vis_d64 dd;               /* 64-bit output data */
    int     dsize;            /* image data size in pixels */
    int     i;
    for (i = 0; i < dsize / 8; i++) {
        sd0 = *sp++;
        sd1 = *sp++;
        sd2 = *sp++;
        sda = vis_fpmerge(vis_read_hi(sd0), vis_read_lo(sd1));
        sdb = vis_fpmerge(vis_read_lo(sd0), vis_read_hi(sd2));
        sdc = vis_fpmerge(vis_read_hi(sd1), vis_read_lo(sd2));
        sdd = vis_fpmerge(vis_read_hi(sda), vis_read_1o(sdb));
        sde = vis_fpmerge(vis_read_lo(sda), vis_read_hi(sdc));
        dd = vis_fpmerge(vis_read_hi(sdd), vis_read_lo(sde));
        *dp++=dd;
    }
}
```

A second example shows extraction of the G-channel from a 3-channel 16-bit image having an interleaved format of R0R1G0G1B0B1R2R3G2G3B2B3 . . . . Again, the microprocessor first samples the 3-channel image by sequentially reading 64-bit data into three 64-bit registers sd0, sd1, and sd2:

```
sd0: -- -- -- G0 G1 -- -- -- --
sd1: G2 G3 -- -- -- -- G4 G5
sd2: -- -- -- -- G6 G7 -- --
```

The microprocessor subsequently performs four moving and merging operations on selected pairs of two 32-bit data to form intermediate data variables for extracting G-channel as

```
sda: --  --  --  --  G0  G4  G1  G5  vis_fpmerge (hi(sd0),lo(sd1))
sdb: G2  G6  G3  G7  --  --  --  --  vis_fpmerge (hi(sd1),lo(sd2))
sdc: G0  G2  G4  G6  G1  G3  G5  G7  vis_fpmerge (lo(sda),hi(sdb))
and
dd:  G0  G1  G2  G3  G4  G5  G6  G7  vis_fpmerge (hi(sdc),lo(sdc))
``` in which the last operation, vis_fpmerge (hi(sdc),lo(sdc)), merges the most significant four bytes and the least significant four bytes of data sdc.

A third example shows extraction of a left channel from a 2-channel 8-bit type image:

```
Sampling:

sd0:    L0  —    L1  —    L2  —    L3  —
sd1:    L4  —    L5  —    L6  —    L7  —
```

-continued

Moving and merge:

| sda: | L0 | L4 | — | — | L1 | L5 | — | — | vis_fpmerge (hi(sd0), hi(sd1)) |
|---|---|---|---|---|---|---|---|---|---|
| sdb: | L2 | L6 | — | — | L3 | L7 | — | — | vis_fpmerge (lo(sd0), lo(sd1)) |
| sdc: | L0 | L2 | L4 | L6 | — | — | — | — | vis_fpmerge:(hi(sda), hi(sdb)) |
| sdd: | L1 | L3 | L5 | L7 | — | — | — | — | vis_fpmerge (lo(sda), lo(sdb)) |
| dd | L0 | L1 | L2 | L3 | L4 | L5 | L6 | L7 | Vis_fpmerge (hi(sdc), hi(sdd)) |

The above-described method and examples are for extracting one arbitrary channel from a channel interleaved data ensemble. In extracting multiple channels, the above method as shown in FIG. 2 can be used to extract one channel at a time in a certain sequence based on a user's need. The exact operation of partitioning, moving and merging data components in extracting one channel may be different from that in extracting another channel.

Alternatively, all channels that are to be extracted can also be extracted simultaneously in a parallel fashion by partitioning, moving and merging data components in a certain optimized sequence. This parallel channel extraction can reduce the number of loading and storing instructions that are needed in sequentially extracting multiple channels. The loaded (or sampled) data and some of the intermediate variables can be shared among the extractions. Thus, extracting multiple channels simultaneously is faster than extracting them one at a time sequentially. This improves the operation efficiency.

For example, all the three channels in the 3-channel (RGB) 8-bit type image in the first example can be extracted simultaneously in the following extraction operation. First, the microprocessor samples the 3-channel image by sequentially reading three 8-byte data into three 64-bit registers sd0, sd1, and sd2:

| sd0: | R0 | G0 | B0 | R1 | G1 | B1 | R2 | G2 |
|---|---|---|---|---|---|---|---|---|
| sd1: | B2 | R3 | G3 | B3 | R4 | G4 | B4 | R5 |
| sd2: | G5 | B5 | R6 | G6 | B6 | R7 | G7 | B7 |

Next, intermediate data variables sda, sdb, sdc, sde, and sdf are formed by partitioning, moving and merging in an optimized sequence for extracting the three channels:

| sda: | R0 R4 | G0 G4 | B0 B4 | R1 R5 | vis_fpmerge (hi(sd0), lo(sd1)) |
|---|---|---|---|---|---|
| sdb: | G1 G5 | B1 B5 | R2 R6 | G2 G6 | vis_fpmerge (lo(sd0), hi(sd2)) |
| sdc: | B2 B6 | R3 R7 | G3 G7 | B3 B7 | vis_fpmerge (hi(sd1), lo(sd2)) |
| sdd: | R0 R2 | R4 R6 | G0 G2 | G4 G6 | vis_fpmerge (hi(sda), lo(sdb)) |
| sde: | B0 B2 | B4 B6 | R1 R3 | R5 R7 | vis_fpmerge (lo(sda), hi(sdc)) |
| sdf: | G1 G3 | G5 G7 | B1 B3 | B5 B7 | vis_fpmerge (hi(sdb), lo(sdc)) |

Finally, all three channels are extracted

| dd0: | R0 R1 R2 R3 R4 R5 R6 R7 | vis_fpmerge (hi(sdd), lo(sde)) |
|---|---|---|
| dd1: | G0 G1 G2 G3 G4 G5 G6 G7 | vis_fpmerge (lo(sdd), hi(sdf)) |
| dd2: | B0 B1 B2 B3 B4 B5 B6 B7 | vis_fpmerge (hi(sde), lo(sdf)) |

The above parallel channel extraction can be implemented in a C program as follows:

```
void
ImageChannelExtractAll3_U8_3()
{
    vis_d64 *sp;                    /* pointer to input data */
    vis_d64 *dp0, *dp1, *dp2;       /* pointers to output data */
    vis_d64 sd0, sd1, sd2;          /* 64-bit input data */
    vis_d64 sda, sdb, sdc;          /* 64-bit intermediate values */
    vis_d64 sdd, sde, sdf;          /* 64-bit intermediate values */
    vis_d64 dd0, dd1, dd2;          /* 64-bit output data */
    int     dsize;                  /* image data size in pixels */
    int     i;
    for (i = 0; i < dsize / 8; i++) {
        sd0 = *sp++;
        sd1 = *sp++;
        sd2 = *sp++;
        sda = vis_fpmerge(vis_read_hi(sd0), vis_read_lo(sd1));
        sdb = vis_fpmerge(vis_read_lo(sd0), vis_read_hi(sd2));
        sdc = vis_fpmerge(vis_read_hi(sd1), vis_read_lo(sd2));
        sdd = vis_fpmerge(vis_read_hi(sda), vis_read_lo(sdb));
        sde = vis_fpmerge(vis_read_lo(sda), vis_read_hi(sdc));
        sdf = vis_fpmerge(vis_read_hi(sdb), vis_read_lo(sdc));
        dd0 = vis_fpmerge(vis_read_hi(sdd), vis_read_lo(sde));
        dd1 = vis_fpmerge(vis_read_lo(sdd), vis_read_hi(sdf));
        dd2 = vis_fpmerge(vis_read_hi(sde), vis_read_lo(sdf));
        *dp0++ = dd0;
        *dp1++ = dd1;
        *dp2++ = dd2;
    }
}
```

In this method, three load and three store instructions are used in each iteration. Nine vis_fpmerge instructions are used but some of them can be grouped with load or store instructions. The add instructions for pointer increment may also be grouped with vis_fpmerge, load or store instructions when the loop is pipelined. So the best performance for this method is 0.375 cycles/byte (i.e., 9 cycles for vis_fpmerge/ 24 bytes). The processing efficiency of this parallel channel extraction is twice of that of the sequential channel extraction by repeating ImageChannelExtractRed_U8_3() in the first example.

Figure 3:
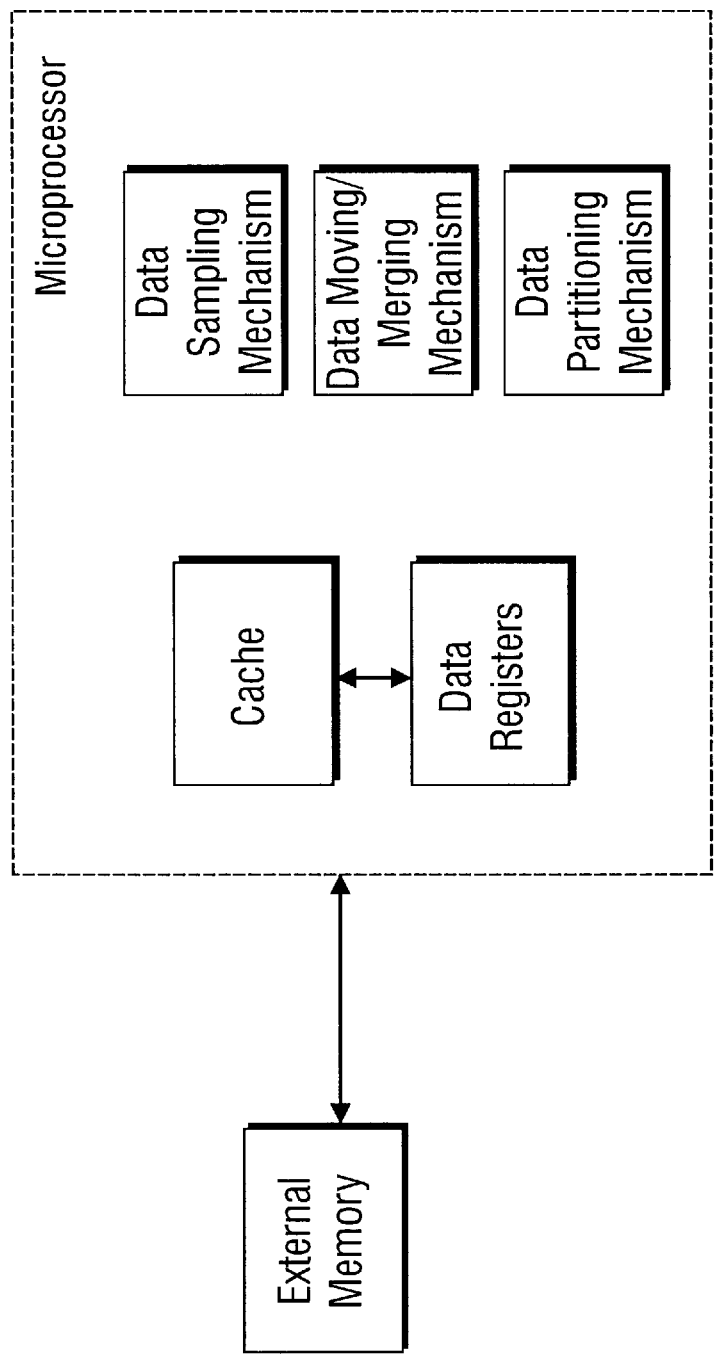
FIG. 3 is a block diagram of a microprocessor in accordance with the present invention.

FIG. 3 shows one embodiment of a microprocessor for performing the channel extraction in accordance with the invention. The microprocessor has a cache memory element with an input and output interface. The cache is operable to allow storage and retrieval of information in communication with an external memory device. A plurality of data registers is disposed relative to the cache memory element in the microprocessor and communicates with the cache memory element for reading and writing information.

According to the invention, the microprocessor has a sampling mechanism for controlling the cache memory element and registers for sampling data, a partitioning mechanism for partitioning a selected group of the sampled data according to a partitioning criterion into partitioned data components, a data merging mechanism for combining the partitioned data components to form intermediate data variables to facilitate the channel extraction.

Other components that are necessary for a microprocessor are well known in the art and are not explicitly shown in FIG. 3. For example, arithmetic logic units (ALUs) are not shown here.

Figure 4:
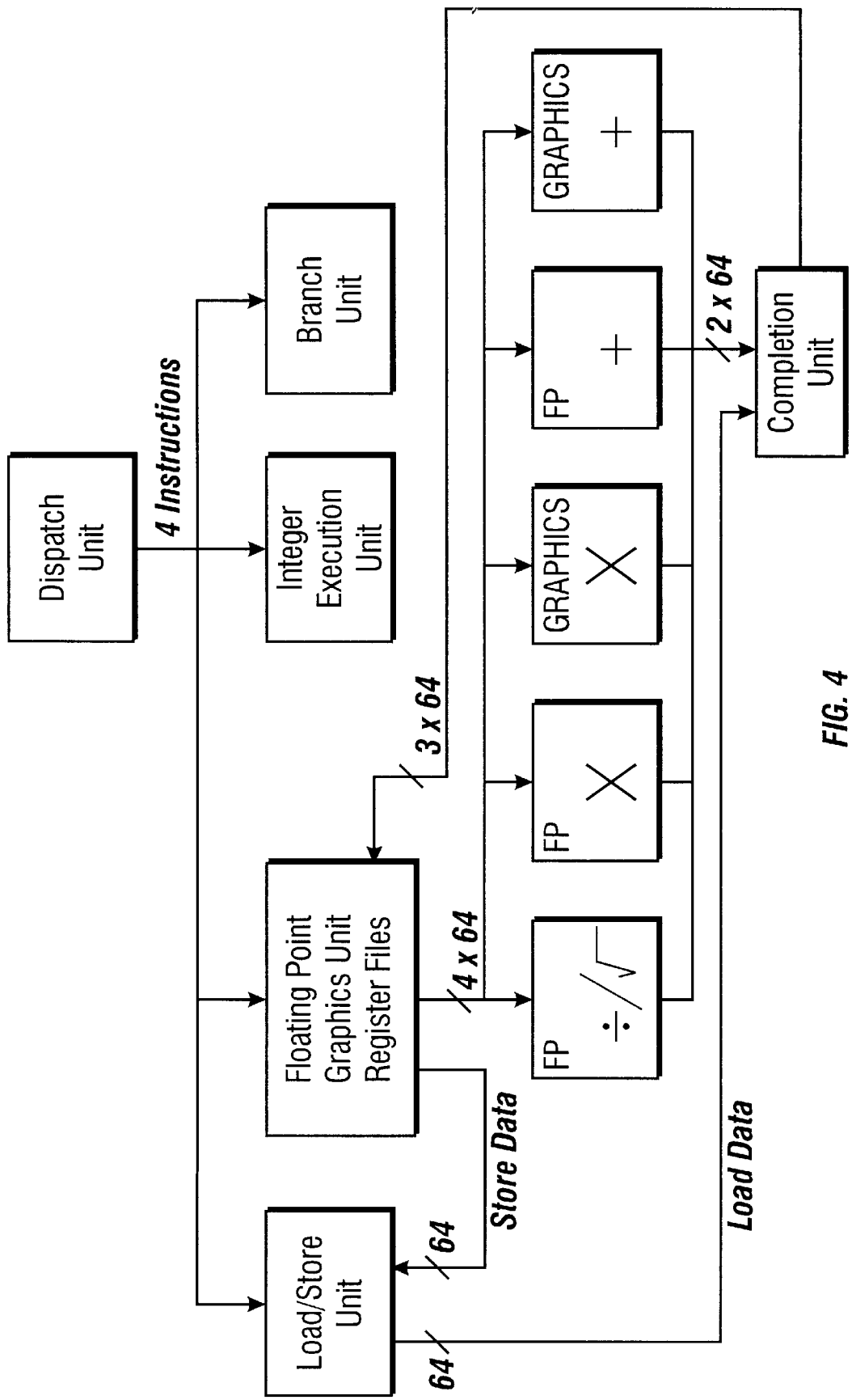
FIG. 4 is a block diagram of a floating point graphics unit used in one of UltraSPARC processors for on-chip graphics support.

FIG. 4 shows function blocks of a floating point graphics unit implemented in one of the UltraSPARC processors for on-chip graphics support. This processor can be used to perform the channel extraction according to the invention.

Although the present invention has been described in detail with reference to the preferred embodiment, one ordinarily skilled in the art to which this invention pertains will appreciate that various modifications and enhancements may be predictable. For example, the preferred embodiment uses 64-bit registers to sample the multi-channel data from the memory. Registers with bit sizes other than 64 can be used, such as 128-bit registers.

For another example, a data in a 8-byte register is partitioned into two 4-byte word components, the most significant 4-byte word and the least significant 4-byte word, in the above extraction operation. Other data partitioning methods may be used, including partition with more than two word components and partition with word components of different bit lengths.

These modifications and others are intended to be encompassed by the following claims.

What is claimed is:

1. A computer-based method for extracting a channel of data from an ensemble of data representing a plurality of channels in which the data of said channel are interleaved with data of other channels, comprising:

sampling said ensemble of data to obtain sampled data segments with a predetermined data length, the number of said sampled data segments being equal to a number of said channels;

partitioning a selected one of said sampled data segments according to a partitioning criterion for extracting said channel into partitioned components;

combining said partitioned components to form intermediate data variables having said predetermined data length, said intermediate data variables being formed in a way to facilitate said extraction of said channel; and repeating said partitioning with both said sampled data segments and said intermediate data variables until a data variable is formed by said combining only with data components of said ensemble of data that are indicative of said channel.

2. A method as in claim 1, wherein said predetermined data length is 8 bytes or 16 bytes.

3. A method as in claim 2, wherein said data extraction is performed in an UltraSPARC microprocessor system and said combining is performed with a fpmerge instruction of the Visual Instruction Set.

4. A method as in claim 3, wherein said partitioning is carried out by using a read_hi instruction and a read_lo instruction of the Visual Instruction Set.

5. A method as in claim 1, wherein said partitioning criterion includes splitting each of said sampled data segments and data variables into a least-significant-word part and a most-significant-word part.

6. A method as in claim 5, wherein said least-significant-word part and said most-significant-word part have the same length.

7. A method as in claim 1, wherein said number of channels is an odd number.

8. A method as in claim 1, wherein said combining includes merging at least two partitioned components from said sampled data segments and said data variables by selecting bytes therefrom in an alternating manner.

9. A method of processing a color image that is represented digitally by an ensemble of data that interleaves data components of channels including at least a red channel, a green channel, and a blue channel, comprising:

sampling said ensemble of data to obtain a plurality of sampled data with a predetermined data length, a number of said sampled data being equal to a number of said channels;

partitioning a first group of said sampled data for extracting a first color channel with each sampled data being partitioned into a most-significant-word component and a least-significant-word component;

selecting two of said most-significant-word components and least-significant-word components and combining thereof to form a plurality of intermediate data variables having said predetermined data length, said data variables being formed in a way to facilitate said extraction of said first color channel;

repeating said partitioning with both said sampled data and said intermediate data variables until a first data variable is formed by said selecting and combining, said first data variable having only data components of said first color channel; and processing data components in said first data variable for said first color channel.

10. A method as in claim 9, further comprising:

partitioning a second group of said sampled data for extracting a second color channel with each data being partitioned into a most-significant-word component and a least-significant-word component;

selecting two of said most-significant-word components and least-significant-word components from said second group and combining thereof to form a plurality of second intermediate data variables having said predetermined data length, said second data variables being formed in a way to facilitate said extraction of said second color channel;

repeating said partitioning with both said sampled data and said second intermediate data variables until a second data variable is formed by said selecting and combining, said second data variable having only data components of said second color channel; and processing data components in said second data variable for said second color channel.

11. A method as in claim 10, wherein said processing of said second data variable for said second color channel is independent of said processing of said first data variable for said first color channel.

12. A method as in claim 10, wherein said first data variable for said first color channel and said second data variable for said second color channel are formed simultaneously in a parallel manner in a single process.

13. A method as in claim 10, wherein said first data variable for said first color channel and said second data variable for said second color channel are formed sequentially in two separate processes.

* * * * *